United States Patent [19]

Sullivan

[11] Patent Number: 4,764,971
[45] Date of Patent: Aug. 16, 1988

[54] IMAGE PROCESSING METHOD INCLUDING IMAGE SEGMENTATION

[75] Inventor: James R. Sullivan, Spencerport, N.Y.

[73] Assignee: Eastman Kodak Company, Rochester, N.Y.

[21] Appl. No.: 802,113

[22] Filed: Nov. 25, 1985

[51] Int. Cl.[4] ............ G06K 9/34; G06K 9/36; H04N 7/12

[52] U.S. Cl. ............... 382/9; 382/41; 358/135; 364/554; 364/577

[58] Field of Search ........... 364/554, 518, 521, 577; 340/738; 382/18, 51, 9, 52, 22, 50, 41; 375/25-28, 34; 358/135; 332/11 D

[56] References Cited

U.S. PATENT DOCUMENTS

| | | | |
|---|---|---|---|
| 3,699,446 | 10/1972 | Sainte-Beuve | 375/27 |
| 3,737,855 | 6/1973 | Cutaia | 382/50 |
| 4,462,081 | 7/1984 | Lehan | 364/554 |
| 4,468,703 | 8/1984 | Fujiwara et al. | 382/51 |
| 4,493,106 | 1/1985 | Farhangi et al. | 382/51 |
| 4,499,486 | 2/1985 | Faureau et al. | 364/554 |
| 4,509,195 | 4/1985 | Nadler | 382/51 |
| 4,573,167 | 2/1986 | Hentschke et al. | 375/27 |
| 4,583,114 | 4/1986 | Catros | 358/135 |
| 4,631,735 | 12/1986 | Qureshi | 375/34 |

OTHER PUBLICATIONS

Nahi and Jahanshahi, Image Boundary Estimation, Aug. 1977, IEEE Transactions on Computers, vol. C-26, No. 8, pp. 772-781.

Abdov and Pratt, Quantitative Design and Evaluation of Enhancement/Thresholding Edge Detectors, May 1979, Proceedings of the IEEE, vol. 67, No. 5, pp. 753-763.

Schau, Statistical Filter for Image Feature Extraction, Jul. 1, 1980, Applied Optics, vol. 19, No. 13, pp. 2182-2190.

Sage & Melsa, Estimation Theory, ©1971, pp. 142-145, 148-171.

Falconer et al., Adaptive Channel Memory Truncation for Maximum Likelihood Sequence Estimation, Bell Technical Journal, vol. 52, No. 9, pp. 1541-1562.

Maximum Likelihood Sequence Estimation of Digital Sequences in the Presence of Intersymbol Interference, Forney, Jr., IEEE, vol. IT-18, No. 3, 363-378.

Pratt, Digital Image Processing, ©1978, John Wiley & Sons, pp. 18, 19, 534-538 and Chapter 17.

Sage and Melsa, Estimation Theory with Applications to Communications and Control, ©1971, Chapter 5.

"Image Segmentation by Pixel Classification in (Gray Level, Edge Value) Space" by D. P. Panda and A. Rosenfeld, IEEE Transactions on Computers, vol. c-27, No. 9, Sep. 1978.

"Image Segmentation by Interative Method" by K. Sakaue and M. Takagi, IEEE Trans., 1982.

Primary Examiner—Parshotam S. Lall
Assistant Examiner—S. A. Melnick
Attorney, Agent, or Firm—Thomas H. Close

[57] ABSTRACT

An image signal is segmented into regions of constant contrast or variance by applying a generalized-likelihood-ratio test to an image difference signal.

4 Claims, 4 Drawing Sheets

IMAGE PROCESSING METHOD INCLUDING IMAGE SEGMENTATION

TECHNICAL FIELD

The present invention relates to the field of digital image processing and more particularly to a method for segmenting an image signal line by line into segments of constant variance or contrast.

BACKGROUND ART

Image segmentation is an initial step in many image processing methods such as feature extraction, pattern recognition, image enhancement, and noise reduction. One type of image segmentation called amplitude segmentation separates an image into segments having similar amplitude (luminance) employing a luminance threshold operation. See "Digital Image Processing" by W. K. Pratt, pp. 534–538, John Wiley & Sons, 1978. Often luminance thresholding is not adequate to segment an image, and other information such as edge information has been used to improve the image segmentation. See for example "Image Segmentation by Pixel Classification in (Gray Level, Edge Value) Space" by D. P. Panda and A. Rosenfeld. Abdou and Pratt have outlined a statistical procedure for segmenting an image signal. See the artical "Qaulitative Design and Evaluation of Enhancement/Threshold Edge Detectors" Proceedings of the IEEE, Vol. 67, No. 5, May 19, 1979, page 753–763. At page 756 of the article the authors suggest employing a maximum likelihood ratio test on the pixel values of an image for the hypothesis that an edge exists at any given pixel, based upon a statistical model of the edge probabilities in the image. However, the authors do not derive actual operating equations for the purposed method due to two difficulties which they duly note. First, there does not exist a single edge model for any large class of images of interest, and therefore, one must have a prior knowledge of the edge probabilities for a limited class of images to which the image to be processed belongs. The second difficulty is that for many complex edge models, no analytical solution exists to derive the maximum likelihood estimators employed in the maximum likelihood ratio test. Because of these problems, after mentioning the possiblity of a statistical approach to image segmentation, the authors turn their attention to techniques employing matched filters to perform segmentation. A problem with these prior art image segmentation methods is that they require as inputs ad hoc threshold levels, and require that empirical assumptions be made about the nature of the images that are to be segmented. In addition, statistical techniques that are based on pixel values can achieve at best two-pixel resolution because such techniques require independent sample sets and since both the mean and variance can change within an image, each sample set requires two pixels to estimate the two unknowns. It is an object of the present invention to provide an image segmentation method that requires a minimum of ad hoc inputs, and produces a more accurate segmentation for all classes of images of interest to a human observer.

DISCLOSURE OF THE INVENTION

The objects of the present invention are achieved by using a generalized-likelihood-ratio test (GLR test) on the variance values of adjacent pixel difference signals. The GLR test examines the validity of the null hypothesis $H_\phi$ that two segments have the same variance, assuming a Laplacian probability density function (pdf) for the image difference signal. The image signal processing method employs the steps of: forming an image pixel difference signal by subtracting adjacent pixel values; forming a maximum likelihood (ML) estimator for the variance signal of a distribution having a Laplacian pdf; forming a generalized-likelihood-ratio test (GLR test) for the null hypothesis $H_\phi$ that a first set of values from a Laplacian distribution having a variance $\hat{\sigma}$ are statistically similar to a second set of values from a Laplacian distribution having a variance $\sigma_0$; estimating the variance $\sigma_0$ of the values of the samples in a first segment of image difference signals using the ML estimator; estimating the variance $\hat{\sigma}$ of the values of samples in a neighboring segment of image difference signals composed of the next successive image difference signal in a line of image signals using the ML estimator, applying the GLR test to the $\hat{\sigma}$ and $\sigma_0$ values; and if the null hypothesis is true adding the second segment to the first segment to form a single segment, and repeating the steps of estimating and testing until the entire line is processed, if the null hypothesis is false, identifying the first segment as a recognized segment, and beginning a new first segment with the next successive image difference sample, and repeating the steps of estimating and testing until the line of image signals is processed.

MODES OF CARRYING OUT THE INVENTION

Figure 1:
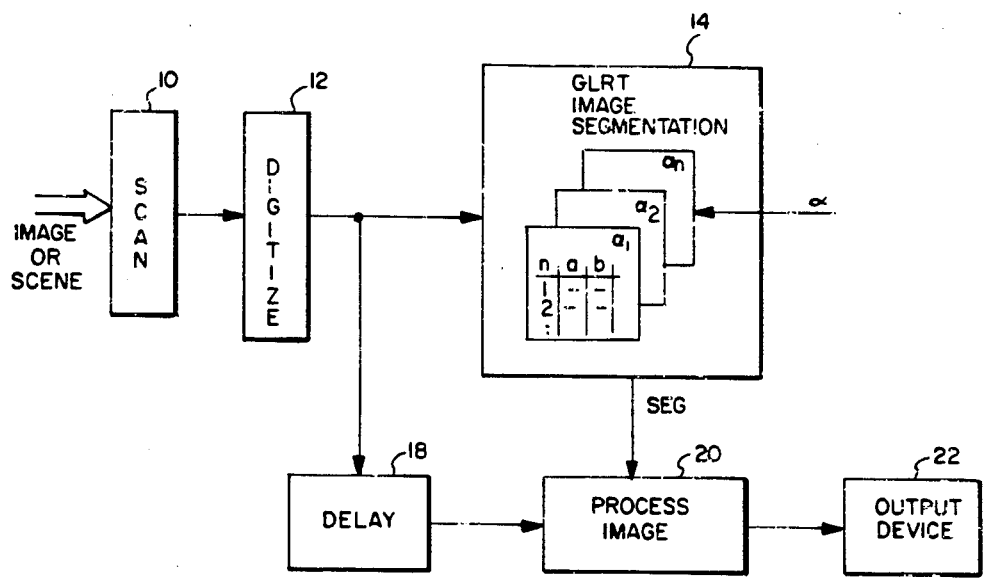
FIG. 1 is a block diagram illustrating apparatus for practicing the image signal processing method according to the present invention.

Before describing the method of the present invention in detail, the derivation of the generalized-likelihood-ratio (GLR) test for the variance of an image difference signal will be described. The methods of maximum likelihood estimation and the generalized-likelihood-ratio test are tools of mathematical statistics and can be found in many textbooks on mathematical statistics such as "An Introduction to Mathematical Statistics" by R. J. Larsen and M. L. Marx, Prentice Hall, Inc., Englewood Cliffs, N.J., 1981.

To determine whether or not two regions of an image are statistically equivalent it is necessary to establish a criterion that distinquishes between the null hypothesis $H_\phi$ that they are the same and the alternative hypothesis $H_1$ that they are not. If $Y(1), Y(2), \ldots, Y(n)$ are a random sample from a distribution Y with the unknown parameter p, the objective is to test $$H_\phi: p=p0$$

versus $$H_1: p=p0$$

at a specified level of significance $\alpha$. Where $\dot{p}$ is the parameter value being tested, and p0 is the value of the parameter, that satisfies the null hypothesis.

First, it is necessary to define two parameter spaces, w and W, where w is the subset of W that includes all unknown parameter values admissible under $H_\phi$. If p is restricted to be a positive real number, as it is for the sigma value of a Laplacian for which the hypotheses will be tested, the spaces in set notation are $w = \{p: p = p0\}$, and $W = \{p: 0 \leq p\}$.

Let L be the joint probability density function (pdf) of the Y(i)'s where p is considered as an independent variable and the y(i)'s are considered fixed, then the likelihood of observing the y(i)'s is given by $$L(p) = \pi_{i=1}^{n} pdf_y(y(i);p). \tag{1}$$

Maximizing the likelihood function under w and separately under W and taking the ratio is then defined as the generalized likelihood ratio, t. Symbolically it is given by $$t = \frac{\max_w L(p)}{\max_W L(p)} = \frac{L(\hat{w})}{L(\hat{W})}. \tag{2}$$

If t is close to 1.0, the spaces w and W are highly overlapped and the hypothesis $H_\phi$ is most likely true. If t is much less than 1.0, w is much smaller than W and the hypothesis is most likely false.

The numerator of t is the maximum likelihood (ML) estimate under w which is simply p0. The denominator of t is the ML estimate under W. Determining W requires a knowledge of the pdf of Y. The stationarity of the assumed pdf is essential to the success of the GLR test.

It is known that the statistics of the adjacent pixel difference data for images that are of interest to a human observer are more stationary than the actual pixel values and are well modelled by a Laplacian. Because of this, the GLR test will be based on the difference data rather than the actual data, and the assumed pdf for a Laplacian distribution is (3)

$$pdf_Y = (1/\sqrt{2} \, p) e^{-\sqrt{2} \, |Y(i)|/p} \tag{3}$$

Defining p as $\sigma$ (the variance of a Laplacian pdf), and Y as $\Delta S$ (the image difference signal), the likelihood function under W is given by $$L(\sigma;\Delta S(1),\Delta S(2),\ldots,\Delta S(n)) = \pi_{i=1}^{n} (1/\sqrt{2} \, \sigma) e^{-\sqrt{2} \, |\Delta S(i)|/\sigma} \tag{4}$$

where $\Delta S(n)$ are successive samples of the image difference signal.

Differentiating ln(L) with respect to $\sigma$ and setting the result to zero to obtain the ML estimate of the variance $\sigma$ under W results in $$\hat{\sigma} = \sqrt{2} /n \sum_{i=1}^{n} |\Delta S(i)|. \tag{5}$$

The generalized likelihood ratio (GLR) is then $$t = \frac{L(\hat{w})}{L(\hat{W})} = \frac{\pi_{i=1}^{n-1} (1/\sqrt{2} \, \sigma_0) e^{-\sqrt{2} \, |\Delta S(i)|/\sigma_0}}{\pi_{i=1}^{n} (1/\sqrt{2} \, \hat{\sigma}) e^{-\sqrt{2} \, |\Delta S(i)|/\hat{\sigma}}}, \tag{6}$$

where $\sigma_0$ is an estimate of the variance $\sigma$ under w. This reduces to $$t = (\hat{\sigma}/\sigma_0)^n e^{-n(\hat{\sigma}/\sigma_0 - 1)}. \tag{7}$$

The numerical behavior of t considered as a function of $(\hat{\sigma}/\sigma_0)$ is such that t decreases to 0 as $(\hat{\sigma}/\sigma_0)$ becomes either increasingly less than 1 or increasingly greater than 1. When $(\hat{\sigma}/\sigma_0)$ equals 1, t equals 1. Table 1 illustrates this pattern for the particular case where n=10.

TABLE 1

GLR Test Statistic for Various Sigma Ratios (n = 10)

| $\sigma/\sigma_0$ | t |
|---|---|
| 0.0 | 0.0 |
| 0.25 | 0.002 |
| 0.50 | 0.145 |
| 0.75 | 0.686 |
| 1.00 | 1.000 |
| 1.50 | 0.389 |
| 2.00 | 0.046 |
| 2.50 | 0.0003 |

Figure 2:
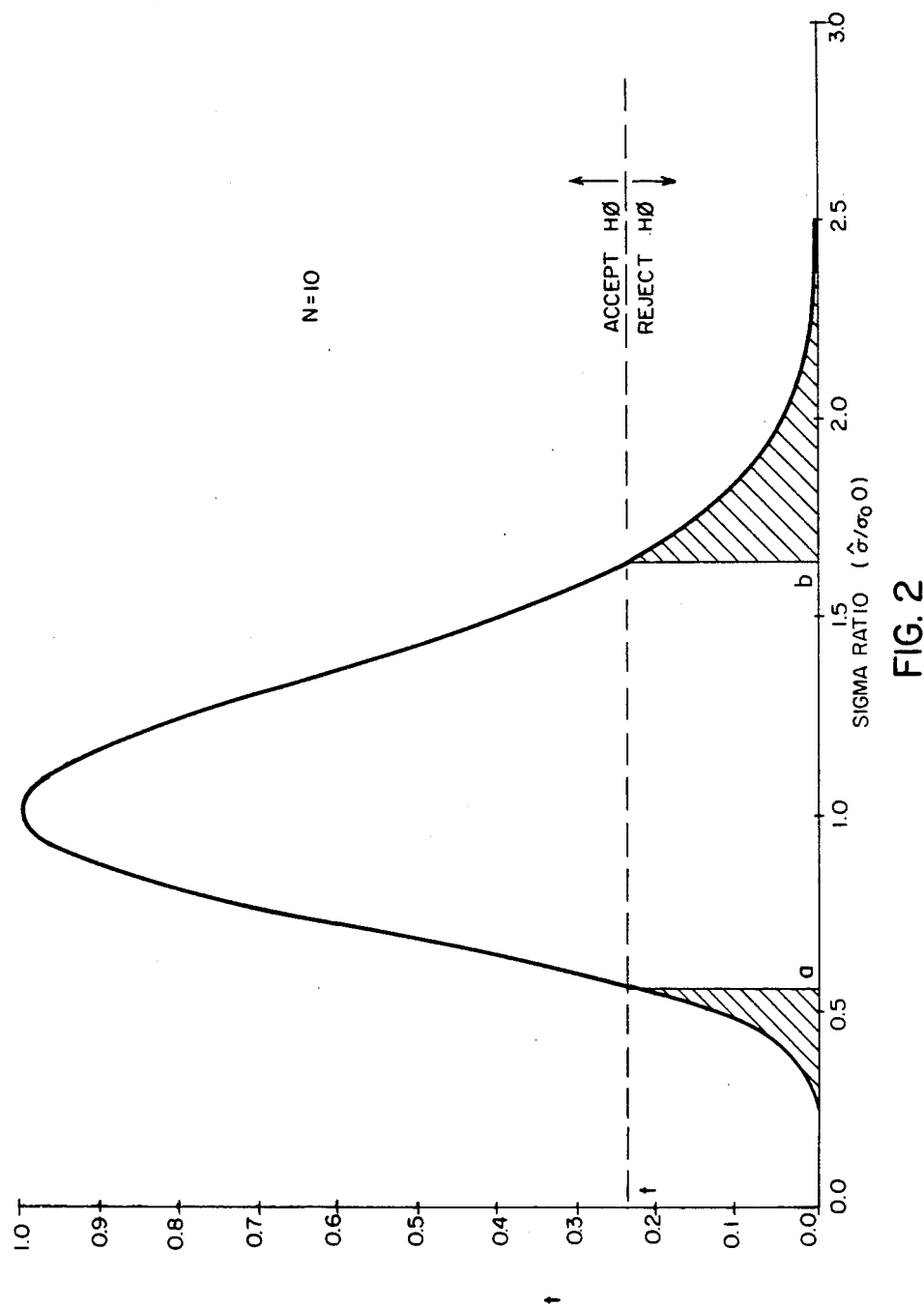
FIG. 2 is a graph showing the generalized-likelihood ratio t plotted vs. the sigma ratio $\hat{\sigma}/\sigma_0$.

For a given level of significance $\alpha$, the likelihood ratio principle states that $H_\phi$ should be rejected for any $t < t^*$, where $\text{Prob}(t < t^* | H_\phi) = \alpha$. As Table 1 indicates, the shape of $t(\hat{\sigma}/\sigma_0)$ requires that the decision rule be divided into two critical regions, one for values of $(\hat{\sigma}/\sigma_0)$ close to 0 and the other for values of $(\hat{\sigma}/\sigma_0)$ much larger than 1. This is illustrated in FIG. 2. As the figure shows an equivalent statement of the decision rule is to reject $H_\phi$ whenever $$\hat{\sigma}/\sigma_0 \leq a \text{ or } \hat{\sigma}/\sigma_0 \geq b \text{ where} \tag{8}$$

$$\text{Prob}(\hat{\sigma}/\sigma_0 \leq a | H_\phi) + \text{Prob}(\hat{\sigma}/\sigma_0 \geq b | H_\phi) = \alpha.$$

Here it is necessary to make a slight approximation by setting the probability of each critical region to $\alpha/2$. The two tails of the critical regions indicated by cross hatching in FIG. 2 do not have exactly the same probability, nevertheless, the two are numerically close enough that the likelihood ratio criterion is not substantially compromised. Equation (8) then becomes $$\text{Prob}(\hat{\sigma}/\sigma_0 \leq a | H_\phi) = \alpha/2, \text{ or}$$

$$\text{Prob}(\hat{\sigma}/\sigma_0 \geq b | H_\phi) = \alpha/2. \tag{9}$$

To apply this decision rule the pdf of $(\hat{\sigma}/\sigma_0)$ given $H_\phi$ is required. Since $\sigma_0$ is a fixed, known value, it is only necessary to determine the pdf of $\hat{\sigma}$ given $H_\phi$. This can derived as follows: Let $S(1), S(2), \ldots, S(n)$ be n independent Laplacian random variables defined by the parameter $\sigma_0$ (i.e. $H_\phi$ is given). We wish to find the pdf of $$\hat{\sigma} n/\sqrt{2} = \sum_{i=1}^{n} |\Delta S(i)|. \tag{10}$$

First, consider the case where $n=1$. It is easy to show that the pdf of $|\Delta S(1)|$ is an exponential, which is not surprising since a Laplacian is nothing more than a two-sided exponential. To derive the pdf of $\hat{\sigma} n/\sqrt{2}$, we resort to moment generating functions. The moment generating function for an exponential pdf defined by the parameter $\hat{\sigma}_0/\sqrt{2}$ is given by $$M_{|\Delta S(i)|}(x) = \frac{1}{1 - x\sigma_0/\sqrt{2}}, \tag{11}$$

for all i, and using the fact that the moment generating function for a sum of independent random variables is the product of the moment generating functions for each variable, the moment generating function for $\hat{\sigma} n/\sqrt{2}$ is $$M_{\hat{\sigma} n/\sqrt{2}}(x) = \frac{1}{(1 - x\sigma_0/\sqrt{2})^n}. \tag{12}$$

This is identical to the moment generating function for a gamma distribution with parameter values n, and $\sqrt{2}/\sigma_0$, and using the theorem that if two random variables have the same moment generating functions for some interval containing 0, they also have the same pdf's, the pdf for $\hat{\sigma} n/\sqrt{2}$ is given by $$pdf_Z(z) = \Gamma(n, \sqrt{2}/\sigma_0) = \frac{(\sqrt{2}/\sigma_0)^n z^{n-1} e^{-\sqrt{2} z/\sigma_0}}{\Gamma(n)}, \tag{13}$$

where $z = \hat{\sigma} n/\sqrt{2} \geq 0$.
The decision rule is now to reject $H_\phi$ whenever either of the following is true $$Prob(z \leq an\sigma_0/\sqrt{2} | Z \sim \Gamma(n,\sqrt{2}/\sigma_0)) = \alpha/2, \text{ or}$$

$$Prob(z \geq bn\sigma_0/\sqrt{2} | Z \sim \Gamma(n,\sqrt{2}/\sigma_0)) = \alpha/2, \tag{14}$$

where a and b are the unknowns.
In integral form the probabilities are given by $$\int_{0}^{an\sigma_0/\sqrt{2}} \Gamma_{Z'}(n, \sqrt{2}/\sigma_0) dz' = \alpha/2, \text{ and} \tag{15}$$

$$\int_{bn\sigma_0/\sqrt{2}}^{\infty} \Gamma_{Z'}(n, \sqrt{2}/\sigma_0) dz' = \alpha/2.$$

By making the substitution $$u = \sqrt{2} z'/\sigma_0, \text{ the integrals become} \tag{16}$$

$$1/\Gamma(n) \int_{0}^{an} u^{n-1} e^{-u} du = \alpha/2, \text{ and}$$

-continued $$1/\Gamma(n) \int_{bn}^{\infty} u^{n-1} e^{-u} du = \alpha/2.$$

The integrals are incomplete gamma functions which can be written as summations, and the equations for the unknowns a and b become $$\alpha/2 = \left\{ 1 - e^{-an} \sum_{r=0}^{n-1} \frac{(an)^{n-1-r}}{(n-1-r)!} \right\}, \text{ and} \tag{17}$$

$$\alpha/2 = e^{-bn} \sum_{r=0}^{n-1} \frac{(bn)^{n-1-r}}{(n-1-r)!}.$$

Given n and $\alpha$, these can be solved for the critical regions a and b, and the decision rule becomes reject $H_\phi$ whenever either of the following is true $$\sum_{i=1}^{n} |\Delta S(i)| = z \leq an\sigma_0/\sqrt{2}, \text{ or} \tag{18}$$

$$\sum_{i=1}^{n} |\Delta S(i)| = z \geq bn\sigma_0/\sqrt{2},$$

or equivalently $$\hat{\sigma}/\sigma_0 \leq a, \text{ or}$$

$$\hat{\sigma}/\sigma_0 \geq b. \tag{19}$$

It remains to specify how the regions for estimating $\sigma_0$, and $\hat{\sigma}$ are defined. After k stationary line segments have been isolated extending from the first pixel to the jth pixel, the value for $\sigma_0$ is the ML estimate for the (k+1)th segment extending from the (j+1)th pixel value to the last value deemed consistent with $H_\phi$. The value for $\hat{\sigma}$ is then the ML estimate for the difference between the last value and the next pixel value. The search is reinitialized at the beginning of each line with the absolute difference between the first and second pixels defining $\sigma_0$ (the ML estimate requires only one difference value), and the absolute difference between the second and third pixels to determine $\hat{\sigma}$.

Figure 3:
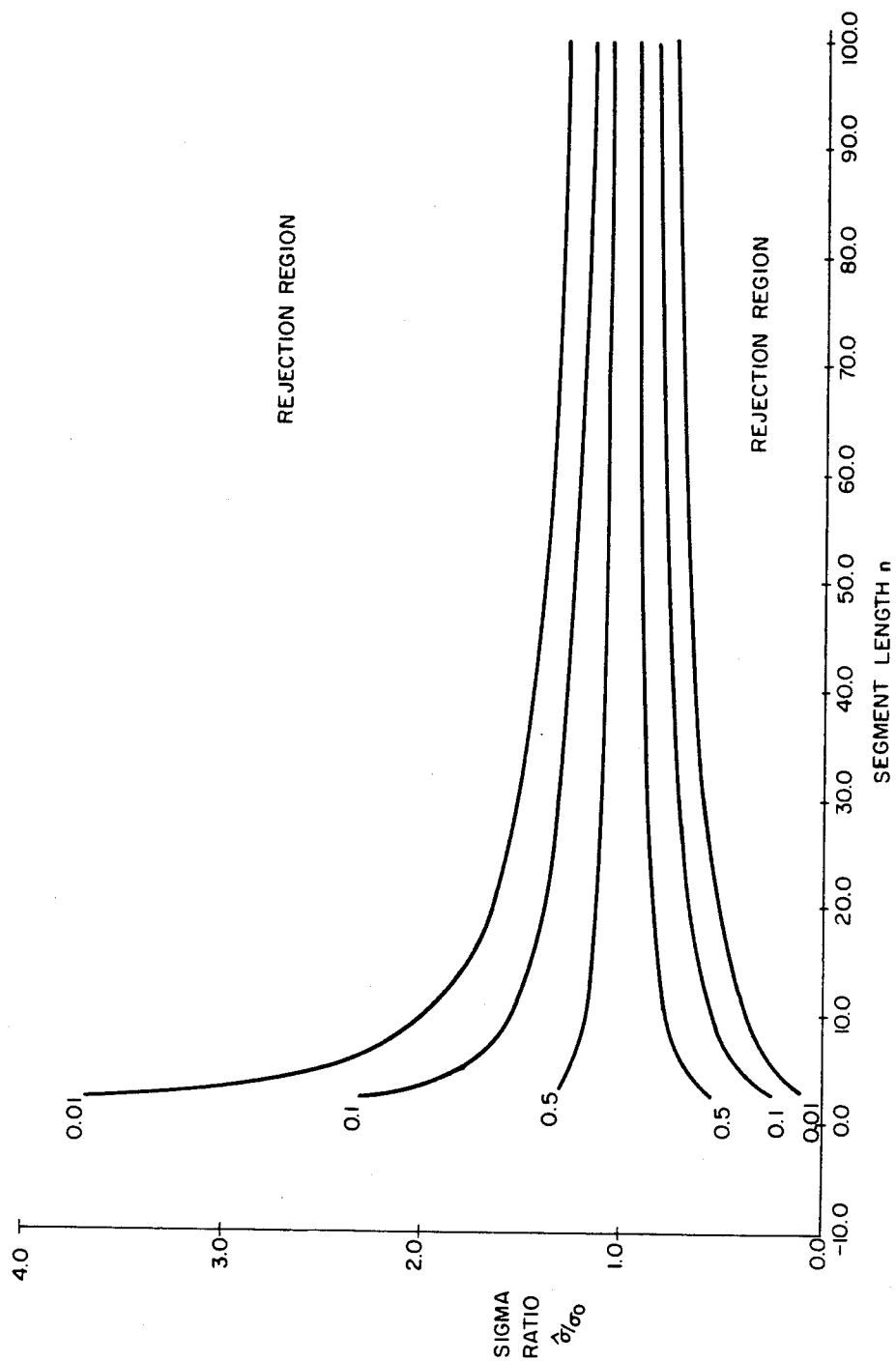
FIG. 3 is a graph showing the critical sigma ratio vs. segment length for various levels of significance $\alpha$.

Stationary segments grow or close along line segments depending on whether the hypothesis $H_\phi$ is accepted or rejected for the next pixel, and $\sigma_0$ $\hat{\sigma}$ are updated appropriately. As defined, stationary regions can be isolated with single pixel resolution because only one parameter is required for each segment and it can be estimated with a single difference signal, and the estimates for $\sigma_0$ and $\hat{\sigma}$ can be calculated recursively making the technique relatively simple to implement. The equations for a and b are not recursively computable due to their non-linear dependence on n. For a given level of significance, values of a and b can be computed off-line and stored in a buffer for a reasonable range of values of n. FIG. 3 shows the dependence of a and b on n for three levels of significance (0.5, 0.1, 0.01). As expected, the criterion for rejection of $H_\phi$ becomes less stringent, i.e., the ratio of $\hat{\sigma}/\sigma_0$ can be closer to 1.0 and still result in a rejection, as n increases. This is intuitively reasonable because adding one difference value to the ML estimate will not change it significantly. The criterion also becomes less stringent as the level of significance increases. Recalling that the level of significance is related to the confidence in accepting $H_\phi$, as $\alpha$ increases acceptance of $H_\phi$ becomes more difficult and rejectance more common. As such, the GLR test is self-adaptive because it non-linearly accounts for variations in n, and $\alpha$ in a statistically optimal manner.

Referring now to FIG. 1, generic image processing apparatus employing the image segmentation method according to the present invention will be described. An image or scene is sampled by scanning apparatus 10, such as a video camera or graphic arts scanner. The sampled image is digitized by an analog to digital converter 12 and the digitized sampled image is segmented by GLRT image segmentation apparatus 14. The sampled image signal is delayed by a delay device 18 to allow time for the image segmentation hardware to identify the image segments before the image is processed further. The delayed image signal and the image segmentation information generated by the image segmentation apparatus are supplied to a digital image processor 20. The image segmentation apparatus and the digital image processor comprise a programmed general purpose digital computer or alternatively a custom designed digital signal processing circuitry. The digital image processor performs the image processing on the image, using the image segment information, and supplies the processed image signal to an output device 22, such as a CRT display or hard copy generator in the case that the image processing was performed to improve the appearance of the image. The image segmentation apparatus 14 includes a memory 16 that contains the tables of values of a and b as a function of the number n for different values of the confidence level $\alpha$. The image segmentation apparatus receives an operator input specifying the desired level of confidence $\alpha$, and selects the appropriate table of values accordingly.

Figure 4:
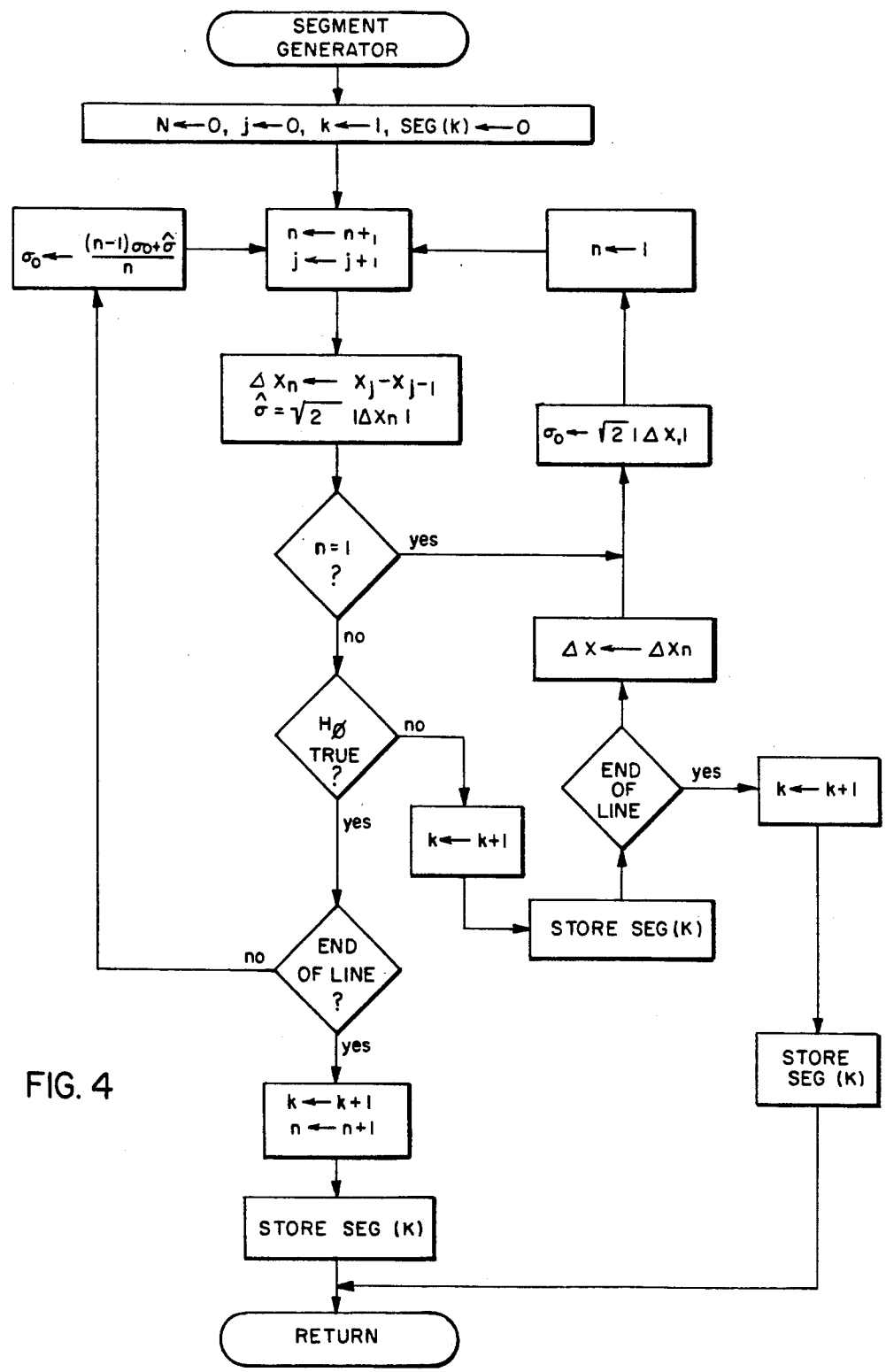
FIG. 4 is a flow chart illustrating the image segmentation method according to the present invention.

The image segmentation method will now be described with reference to the flow chart of FIG. 4. The following description assumes that the image signal is in a linear form resulting from a raster scan. At the start of each scan line, the internal counters n indicating the number of pixels in a segment, j indicating the location of the pixel in the line, and k indicating the number of segments and a point Seg (k) that points to the starting pixel for the kth segment are initialized. Counters n and j are incremented by 1 and then the image difference signal $\Delta X_1$ between the first and second samples of the image signal is formed. A maximum likelihood estimate $\hat{\sigma}$ of the variance of the difference signal $\Delta X_1$ as given by equation (10) is then computed.

Next, a check is made to see if this is the first pixel in a segment (n=1). If so, $\sigma_0$ (an estimate of the variance of the segment as generated thus far) is set to equal the square root of two times the absolute value of $\Delta X_1$ and n is incremented by 1. The next difference signal $\Delta X_n$ is formed, and the maximum likelihood estimate $\hat{\sigma}$ of the variance of the difference signal is formed. This time, n does not equal 1, and the null hypothesis ($H_\phi$) that the sigma value of the present segment is equivalent to the sigma value of the present segment plus the next image difference signal sample is checked. If the null hypothesis is true and it is not the end of the scan line, $\sigma_0$ is updated by factoring in $\hat{\sigma}$, and another $\Delta X$ is formed and added to the segment for testing. If the null hypothesis is false, the segment is ended, k is incremented by 1, and the value Seg (k), is stored in a register. If it is the end of the line, the location of the kth segment is stored and the process is repeated for the next line. If it is not the end of the line, $\Delta X_1$ is set to $\Delta_n$, $\sigma_0$ is set to the square root of two times the absolute value of $\Delta X_1$, n is set to 1, and the next segment building process is started. When the last pixel of a scan line is reached k and n are incremented, Seg (k) is stored in the register for the last segment of the line.

The check on the truth of the null hypothesis $H_\phi$ involves testing whether inequalities (19) are satisfied by referring to the values of a and b for the given level of confidence $\alpha$ that were computed from equations (17) and stored in the memory.

Figure 5:
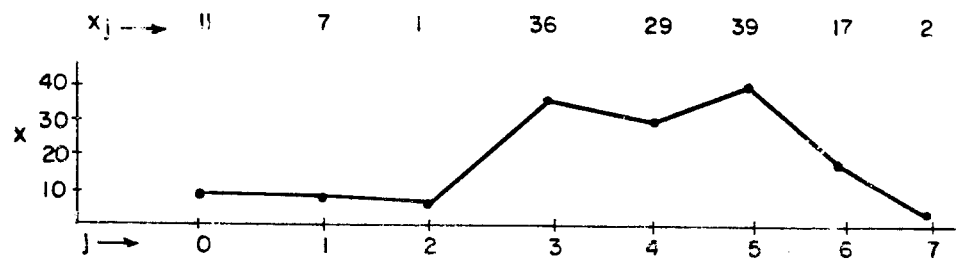
FIG. 5 is a graph illustrating a portion of an image signal useful in explaining the operation of the present invention.

Application of the method of image segmentation will now be described with reference to a numerical example shown in the graph of FIG. 5. FIG. 5 shows the first seven samples in a line of image information. The sample values $X_j$ are shown above the graph. The level of significance $\alpha$ was chosen to be 0.25, i.e. 75% confidence that the rejection of the Null Hypothesis $H_\phi$ is correct. A table of values for a and b for segments of given length n at a confidence level of 75% are shown in Table 2 below. These values were computed from equations (17) and stored in a table look-up memory.

TABLE 2

| n- | 1 | 2 | 3 | 4 | 5 | 6 | 7 | 8 | 9 | 10 |
|---|---|---|---|---|---|---|---|---|---|---|
| a- | .134 | .306 | .408 | .476 | .524 | .562 | .592 | .616 | .636 | .654 |
| b- | 2.078 | 1.802 | 1.664 | 1.578 | 1.518 | 1.474 | 1.440 | 1.412 | 1.388 | 1.368 |

The signal shown in FIG. 5 is segmented by the segmentation method as shown by the values in Table 3 where $\Delta_{ij} = |X_i - X_j|$.

TABLE 3

| test | n | j | k | $\Delta X_n$ | $\hat{\sigma}$ | $\sigma_0$ | $\sigma/\sigma_0$ | Seg (k) |
|---|---|---|---|---|---|---|---|---|
| | 0 | 0 | 1 | — | — | — | — | 0 |
| n = 1 | 1 | 1 | 1 | $X_1 - X_0$ | $\sqrt{2}\Delta_{10}$ | — | — | 0 |
| n = 1 $H\phi$ true end false | 2 | 2 | 1 | $X_2 - X_1$ | $\sqrt{2}\Delta_{21}$ | $\sqrt{2}\Delta_{10}$ | 1.50 | 0 |
| n = 1 $H\phi$ false | 3 | 3 | 1 | $X_3 - X_2$ | $\sqrt{2}\Delta_{32}$ | $\sqrt{2}/2 (\Delta_{21} + \Delta_{10})$ | 7.00 | 0 |
| | 1 | 3 | 2 | $X_3 - X_2$ | $\sqrt{2}\Delta_{32}$ | $\sqrt{2}\Delta_{32}$ | — | 3 |
| n = 1 $H\phi$ false | 2 | 4 | 2 | $X_4 - X_3$ | $\sqrt{2}\Delta_{43}$ | $\sqrt{2}\Delta_{32}$ | 0.20 | 3 |
| | 1 | 4 | 3 | $X_4 - X_3$ | $\sqrt{2}\Delta_{43}$ | $\sqrt{2}\Delta_{43}$ | — | 4 |
| n = 1 $H\phi$ true end false | 2 | 5 | 3 | $X_5 - X_4$ | $\sqrt{2}\Delta_{54}$ | $\sqrt{2}\Delta_{43}$ | 1.43 | 4 |
| n = 1 $H\phi$ false | 3 | 6 | 3 | $X_6 - X_5$ | $\sqrt{2}\Delta_{65}$ | $\sqrt{2}/2 (\Delta_{54} + \Delta_{43})$ | 2.58 | 4 |
| | 1 | 6 | 4 | $X_6 - X_5$ | $\sqrt{2}\Delta_{65}$ | $\sqrt{2}\Delta_{65}$ | — | 6 |
| n = 1 $H\phi$ true end true | 2 | 7 | 4 | $X_7 - X_6$ | $\sqrt{2}\Delta_{76}$ | $\sqrt{2}\Delta_{65}$ | 0.68 | 6 |
| | 3 | 7 | 5 | $X_7 - X_6$ | $\sqrt{2}\Delta_{76}$ | $\sqrt{2}\Delta_{65}$ | 0.68 | 0 |

From the values in Table 3 it can be seen that the first segment identified by the method extends from the first sample $X_0$ to the third sample $X_2$. The next segment extends from sample $X_2$ to $X_3$, the next from $X_3$ to $X_5$, and the last segment from $X_5$ to $X_7$.

INDUSTRIAL APPLICABILITY AND ADVANTAGES

The image segmentation method can be employed in image processing methods such as image coding, restoration, enhancement, and pattern recognition where it is useful to separate the image into regions of constant variance or contrast. In particular, the method is advantageously employed in a statistical image restoration scheme using a maximum a posteriori (MAP) filter to remove noise from an image signal. The noise restoration method is the subject of copending Application No. 802,107, filed Nov. 25, 1985, by the present Inventor. A major advantage of the image segmentation method is that only one empirically selected parameter, the level of significance $\alpha$ of the GLR test, is required. Another advantage is that since the image difference signal is highly stationary, the statistical test is optimal in a mathematically tractable manner. Other advantages are that the method is self-adaptive, recursively computable, and simple to implement in image processing hardware. It also provides for single pixel resolution which is unachievable with statistical techniques that operate on the pixel values rather than the difference pixel values.

I claim:

1. An image processing method comprising the steps of:
    a. scanning an image to produce an image signal;
    b. digitizing the image signal to produce a digital image having pixel amplitude values;
    c. forming an image difference signal by taking differences between successive pixel amplitude values in the digital image;
    d. segmenting in segmenting means the digital image into segments of pixel amplitude values having constant variance by applying a generalized likelihood ratio test (GLRT) to the image difference signal, to identify image segments, the GLRT testing for the hypothesis $H_\phi$ that a first set of image amplitude difference values from a Laplacian distribution having a variance $\sigma$ are statistically similar to a second set of image amplitude difference values having a variance $\sigma_0$ to within a confidence level $\alpha$, where $\alpha$ is an operator input value, the GLRT employing a generalized likelihood ratio (GLR) that is the ratio of maximum likelihood (ML) estimators for the variance $\sigma$ of a distribution having a Laplacian probability density function (pdf);
    e. supplying said segments to image processing means;
    f. processing in said image processing means the digital image employing said identified image segments to produce a processed digital image; and
    g. supplying said processed digital image to an output device.

2. The image processing method claimed in claim 1, wherein said step of segmenting further includes the steps of:
    a. estimating, in estimating means, the variance $\sigma_0$ of pixel amplitude difference values in a first segment of said image difference signal using the ML estimator;
    b. estimating, in estimating means, the variance $\sigma$ of the pixel amplitude difference values in a second segment of said image difference signal, including the last pixel amplitude difference value of said first segment and the next adjacent pixel amplitude difference value using the ML estimator;
    c. applying said GLRT to $\sigma$ and $\sigma_0$, if the hypothesis $H_\phi$ is true, adding the second segment to the first segment to generate a single segment, and repeating the steps of estimating, or if the hypothesis is false, identifying said first segment as an identified segment and beginning a new first segment with said next adjacent pixel amplitude difference value; and
    d. repeating said steps of estimating and applying said GLRT until said image difference signal is completely segmented.

3. The image processing method claimed in claim 2, wherein said ML estimator is of the form:

$$\sigma = \sqrt{2} /n \sum_{i=1}^{n} |\Delta S_i|$$

where $\Delta S_i$ is the ith pixel difference value and n is the number of pixel difference values in a segment.

4. The image processing method claimed in claim 3, wherein said GLR test is of the form: reject the hypothesis $H_\phi$ whenever $\bar{\sigma}/\sigma_0 \leq a$ or $\geq b$ where a and b are predetermined functions of the confidence level $\alpha$, defined by the following relationships:

$$\alpha/2 = \left\{ 1 - e^{-an} \sum_{r=0}^{n-1} \frac{(an)^{n-1-r}}{(n-1-r)!} \right\}, \text{ and}$$

$$\alpha/2 = e^{-bn} \sum_{r=0}^{n-1} \frac{(bn)^{n-1-r}}{(n-1-r)!},$$

where r is a dummy variable employed in the summation, and n is the number of pixel difference values in a segment.

* * * * *